(12) United States Patent
Beier et al.

(10) Patent No.: US 9,641,075 B2
(45) Date of Patent: May 2, 2017

(54) CURRENT FEEDBACK AND OFFSET VOLTAGE CANCELLATION FOR DC-DC CONVERTER

(71) Applicant: NXP B.V., Eindhoven (NL)

(72) Inventors: Ralf Beier, Hamburg (DE); Gerhard Osterloh, Schülp (DE); Rodrigo Mora-Sanchez, Hamburg (DE)

(73) Assignee: NXP B.V., Eindhoven (NL)

( * ) Notice: Subject to any disclaimer, the term of this patent is extended or adjusted under 35 U.S.C. 154(b) by 148 days.

(21) Appl. No.: 14/563,840

(22) Filed: Dec. 8, 2014

(65) Prior Publication Data

US 2016/0164409 A1   Jun. 9, 2016

(51) Int. Cl.
*H02M 3/156* (2006.01)
*H02M 3/158* (2006.01)
*H02M 1/00* (2006.01)

(52) U.S. Cl.
CPC ........... *H02M 3/158* (2013.01); *H02M 3/156* (2013.01); *H02M 2001/0025* (2013.01)

(58) Field of Classification Search
CPC ................. H02M 3/158; H02M 3/156; H02M 2001/0025; G05F 1/46
USPC .......... 323/271, 222, 224, 282–288
See application file for complete search history.

(56) References Cited

U.S. PATENT DOCUMENTS

| | | | |
|---|---|---|---|
| 7,482,791 B2* | 1/2009 | Stoichita | H02M 3/156 323/271 |
| 8,217,637 B2* | 7/2012 | Tsui | H02M 3/156 323/282 |
| 8,988,056 B2* | 3/2015 | Smith, Jr. | H02M 3/1588 323/282 |
| 9,154,037 B2* | 10/2015 | Chen | H02M 3/158 |
| 9,325,233 B2* | 4/2016 | Bennett | H02M 1/00 |
| 9,467,043 B2* | 10/2016 | Xue | H02M 3/156 |
| 2007/0222423 A1* | 9/2007 | Chen | H02M 3/156 323/283 |
| 2011/0050315 A1* | 3/2011 | Beier | H02M 3/156 327/307 |
| 2013/0002212 A1 | 1/2013 | Fan | |
| 2014/0132232 A1 | 5/2014 | MacLean et al. | |
| 2014/0160601 A1* | 6/2014 | Ouyang | H02M 3/158 361/18 |

(Continued)

OTHER PUBLICATIONS

Search report from STIC EIC 2800 searcher John DiGeronimo.*

(Continued)

*Primary Examiner* — Timothy J Dole
*Assistant Examiner* — Htet Z Kyaw

(57) ABSTRACT

Embodiments of current feedback circuits for Direct Current (DC)-DC converters and methods for operating current feedback circuits for DC-DC converters are described. In one embodiment, a current feedback circuit for a DC-DC converter includes a current replication circuit configured to provide current feedback to the DC-DC converter based on an on-time of the DC-DC converter and an alternating current (AC)-coupling circuit configured to add the current feedback to a regulation circuit of the current feedback circuit and to remove a DC voltage from the current replication circuit. The regulation circuit includes a filter circuit configured to compensate for an offset of an output voltage of the DC-DC converter caused by the current feedback. Other embodiments are also described.

19 Claims, 5 Drawing Sheets

(56) References Cited

U.S. PATENT DOCUMENTS

2015/0108954 A1* 4/2015 Yu .................... H02M 3/158
                                              323/271
2015/0263617 A1* 9/2015 Xue .................... H02M 3/156
                                              323/271

OTHER PUBLICATIONS

Lin, Yu-Cheng et al.; "A Novel Ripple-Based Constant On-Time Control with Virtual Inductance and Offset Cancellation for DC Power Converters"; IEEE, pp. 1244-1250; 2011.
Xu, Xiao-ru et al.; "On-chip boost regulator with projected off- and on-time control"; Univ. Sci A 2009 10(8); pp. 1223-1230; 2009.
International Extended Search Report for the International application No. 15193137.5 dated May 4, 2016.

* cited by examiner

CURRENT FEEDBACK AND OFFSET VOLTAGE CANCELLATION FOR DC-DC CONVERTER

A DC-DC converter converts a direct current (DC) power source from one voltage level to another. A DC-DC converter may be, for example, a Buck DC-DC converter in which the input voltage is higher than the output voltage, a Boost DC-DC converter in which the input voltage is lower than the output voltage, or a Buck-Boost DC-DC converter in which the input voltage is higher or lower than the output voltage.

In a DC-DC converter, such as a Buck DC-DC converter, a Boost DC-DC converter, or a Buck-Boost DC-DC converter, a part of the output current of the DC-DC converter can be fed back to form a stable regulation loop. However, due to the current feedback, an offset can develop in the output voltage of a constant on-time based DC-DC converter. To produce an accurately regulated output voltage over the current range, the output voltage offset needs to be compensated for. In addition, for a system with low power consumption, it is necessary to build up the feedback current without dramatically increasing the quiescent current.

Embodiments of current feedback circuits for Direct Current (DC)-DC converters and methods for operating current feedback circuits for DC-DC converters are described. In one embodiment, a current feedback circuit for a DC-DC converter includes a current replication circuit configured to provide current feedback to the DC-DC converter based on an on-time of the DC-DC converter and an alternating current (AC)-coupling circuit configured to add the current feedback to a regulation circuit of the current feedback circuit and to remove a DC voltage from the current replication circuit. The regulation circuit includes a filter circuit configured to compensate for an offset of an output voltage of the DC-DC converter caused by the current feedback. Compared to a conventional current feedback circuit that uses a complex circuit to realize current feedback and offset cancellation, the current feedback circuit relies on only internal signals of the DC-DC converter for current replication and does not require an external power source. Consequently, compared to a conventional current feedback circuit that uses a complex circuit to realize current feedback and offset cancellation, the current feedback circuit can be implemented in a smaller package with lower component cost. Other embodiments are also described.

In one embodiment, a current feedback circuit for a DC-DC converter includes a current replication circuit configured to provide current feedback to the DC-DC converter based on an on-time of the DC-DC converter and an AC-coupling circuit configured to add the current feedback to a regulation circuit of the current feedback circuit and to remove a DC voltage from the current replication circuit. The regulation circuit includes a filter circuit configured to compensate for an offset of an output voltage of the DC-DC converter caused by the current feedback.

In one embodiment, a current feedback circuit for a DC-DC converter includes a Resistor-Capacitor (RC) network configured to generate a current based on a reference voltage and an on-time of the DC-DC converter, and a second capacitor connected to a node between the first resistor and the first capacitor and configured to add the current feedback to a regulation circuit of the current feedback circuit and to remove a DC voltage from the RC network. The regulation circuit includes a feedback divider circuit connected to the second capacitor and configured to generate a divided feedback signal based on an output voltage of the DC-DC converter, a low-pass filter connected to the second capacitor and to the feedback divider circuit and configured to compensate for an offset of the output voltage of the DC-DC converter caused by the current by filtering a signal that is a combination of the current and the divided feedback signal to generate a filtered signal, and a feedback comparator configured to compare the signal with the filtered signal. The RC network consists of a first resistor and a first capacitor.

In one embodiment, a method for operating a current feedback circuit for a DC-DC converter involves providing current feedback to the DC-DC converter based on an on-time of the DC-DC converter and compensating for an offset of an output voltage of the DC-DC converter caused by the current feedback.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
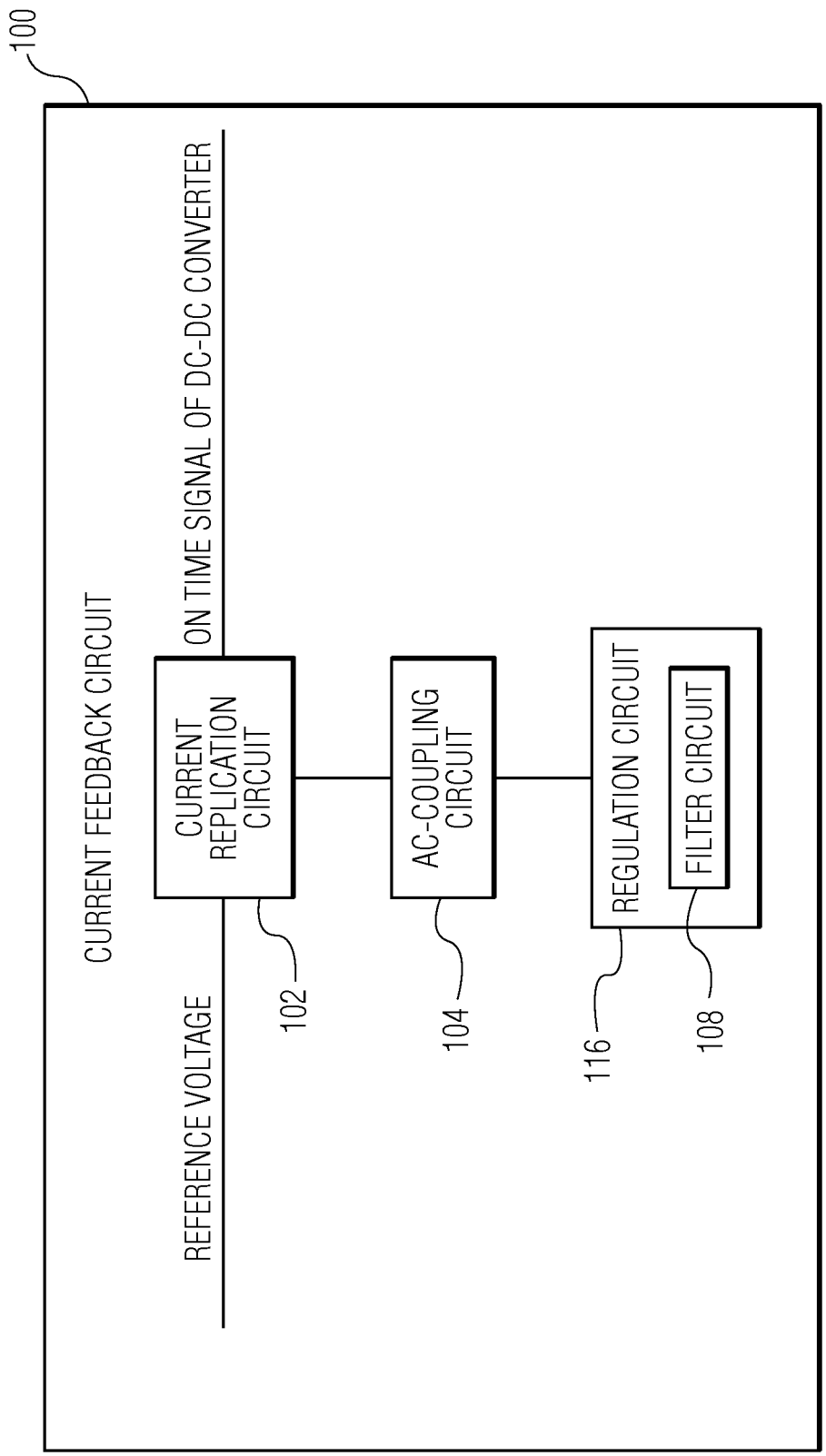
FIG. 1 is a schematic block diagram of a current feedback circuit in accordance with an embodiment of the invention.

FIG. 1 is a schematic block diagram of a current feedback circuit 100 in accordance with an embodiment of the invention. In the embodiment depicted in FIG. 1, the current feedback circuit includes a current replication circuit 102, an AC-coupling circuit 104, and a regulation circuit 116. The current feedback circuit can be used to provide current feedback and the corresponding offset voltage cancellation for a DC-DC converter. Although the current feedback circuit is shown in FIG. 1 as including certain components, in some embodiments, the current feedback circuit includes less or more components to implement less or more functionalities.

Compared to a conventional current feedback circuit that uses a complex circuit with active components to realize current feedback and the offset cancellation, the current feedback circuit 100 depicted in FIG. 1 relies on internal signals of the DC-DC converter for current replication and does not require an external power source. Consequently, the current feedback circuit can generate the replica current feedback using only passive components. Compared to a conventional current feedback circuit that uses a complex circuit to realize current feedback and offset cancellation, the current feedback circuit can be implemented in a smaller package with lower component cost.

The current replication circuit 102 of the current feedback circuit 100 is configured to provide current feedback to a DC-DC converter based on an on-time of the DC-DC converter. The on-time of a DC-DC converter may be, for example, the on-time of the power stage of the DC-DC converter. In some embodiments, the current replication circuit includes a Resistor-Capacitor (RC) network, which may include a resistor and a capacitor. In an embodiment, the current replication circuit includes only one resistor and one capacitor or consists of one resistor and one capacitor. The current replication circuit may be configured to provide a current based on a reference voltage and the on-time of the DC-DC converter. In these embodiments, the reference voltage is an input voltage of the DC-DC converter if the current feedback circuit is used in a boost DC-DC converter and is set to the output voltage of the DC-DC converter if the current feedback circuit is used in a buck DC-DC converter. For a Buck-Boost DC-DC converter, the reference voltage can be dynamically set to a proper voltage.

The AC-coupling circuit 104 of the current feedback circuit 100 is configured to add the current feedback to the regulation circuit 116 of the current feedback circuit and to remove a DC voltage from the current replication circuit 102. In some embodiments, the AC-coupling circuit includes a capacitor. In an embodiment, the AC-coupling circuit includes only one capacitor or consists of one capacitor.

The regulation circuit 116 of the current feedback circuit 100 is used to stabilize the output DC-component over the output load range. In some embodiments, the regulation circuit is used to control the corresponding DC-DC converter by controlling, for example, a constant-on timer (not shown) for the corresponding DC-DC converter. In the embodiment depicted in FIG. 1, the regulation circuit includes a filter circuit 108. In some embodiments, the filter circuit is configured to compensate for an offset of the output voltage of the corresponding DC-DC converter caused by the current feedback generated by the current replication circuit 102. The output voltage of the corresponding DC/DC converter or a scale version of the output voltage of the corresponding DC/DC converter can be used as a reference voltage to the filter circuit.

Figure 2:
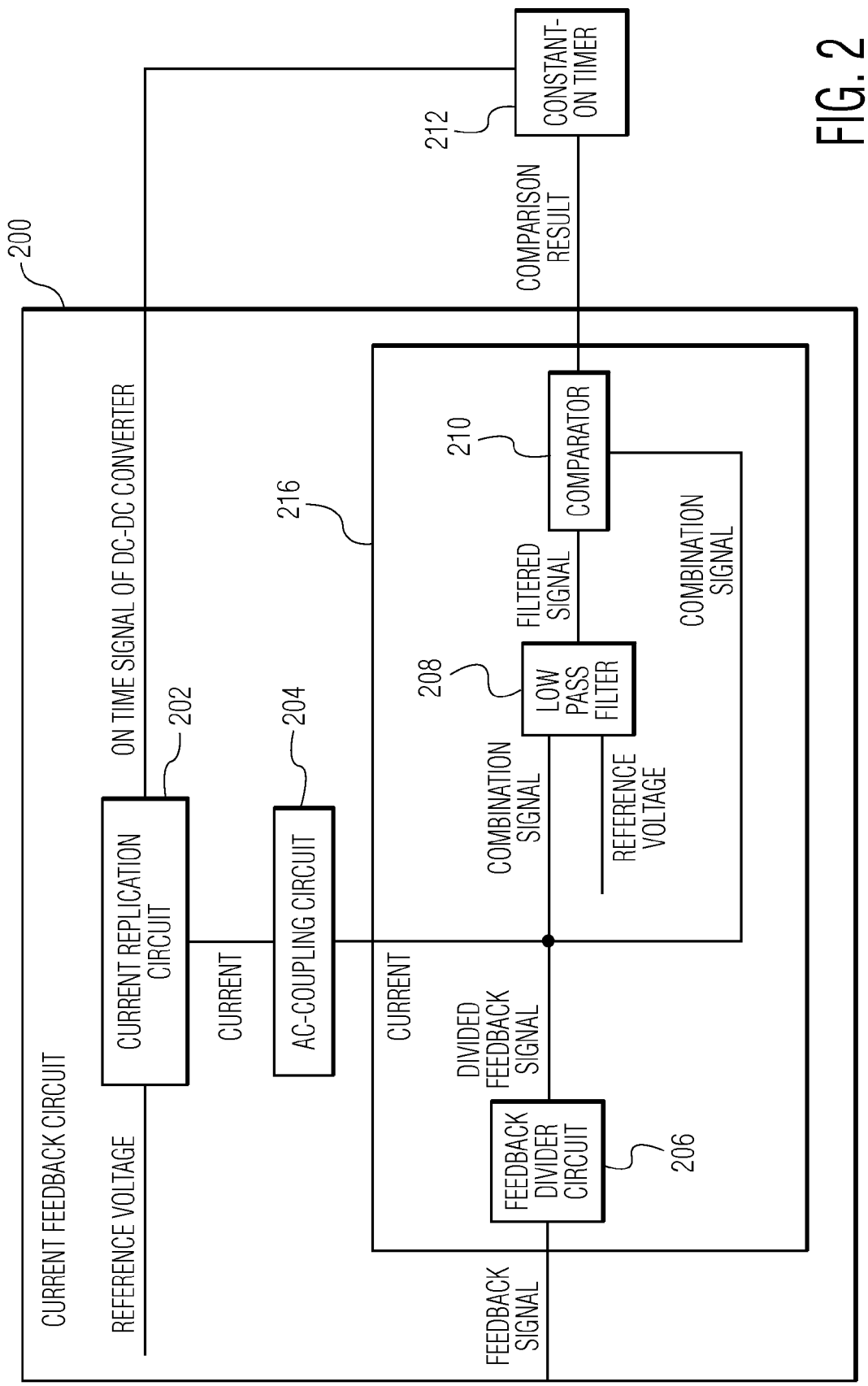
FIG. 2 depicts an embodiment of the current feedback circuit depicted in FIG. 1.

FIG. 2 depicts an embodiment of the current feedback circuit 100 of FIG. 2. In the embodiment depicted in FIG. 2, a current feedback circuit 200 includes a current replication circuit 202, an AC-coupling circuit 204, and a regulation circuit 216 that includes a feedback divider circuit 206, a low-pass filter 208, and a comparator 210. The current feedback circuit is used to provide current feedback for a DC-DC converter. The current feedback circuit 200 depicted in FIG. 2 is one possible embodiment of the current feedback circuit 100 depicted in FIG. 1. However, the current feedback circuit depicted in FIG. 1 is not limited to the embodiment shown in FIG. 2.

The current replication circuit 202 of the current feedback circuit 200 is configured to generate a current based on an on-time of the corresponding DC-DC converter from a constant-on timer 212 of the DC-DC converter and a reference voltage.

The AC-coupling 204 of the current feedback circuit 200 is connected to the current replication circuit 202 and is configured to AC-couple the current replication circuit 202 to the feedback divider circuit 206 in order to add the feedback current to a divided feedback signal generated by the feedback divider circuit 206. The AC-coupling circuit is also used to remove any DC voltage from the current replication circuit. The AC-coupling circuit can generate a processed current based on the current from the current replication circuit or simply pass/relay the current from the current replication circuit.

The feedback divider circuit 206 of the current feedback circuit 200 is connected to the AC-coupling circuit 204 and is configured to receive a feedback signal from the corresponding DC-DC converter and to generate a divided feedback signal. In some embodiments, the feedback signal is the output voltage signal or the output current signal of the DC-DC converter.

The low-pass filter 208 of the current feedback circuit 200 is connected to the AC-coupling circuit 204 and the feedback divider circuit 206 and is configured to compensate for an offset of the output voltage of the corresponding DC-DC converter caused by the current feedback generated by the current replication circuit 202 by filtering a combination signal that is a combination of the current from the AC-coupling circuit and the divided feedback signal generated by the feedback divider circuit to generate a filtered signal. The output voltage of the corresponding DC/DC converter or a scale version of the output voltage of the corresponding DC/DC converter can be used as a reference voltage to the low-pass filter.

The comparator 210 of the current feedback circuit 200 is configured to compare the signal that is a combination of the current generated by the current replication circuit 202 and the divided feedback signal generated by the feedback divider circuit 206 with the filtered signal from the low-pass filter 208. The comparison result from the comparator is input into the constant-on timer 212 of the corresponding DC-DC converter for the generation of the on-time signal, which is input into the current replication circuit 202.

Figure 3:
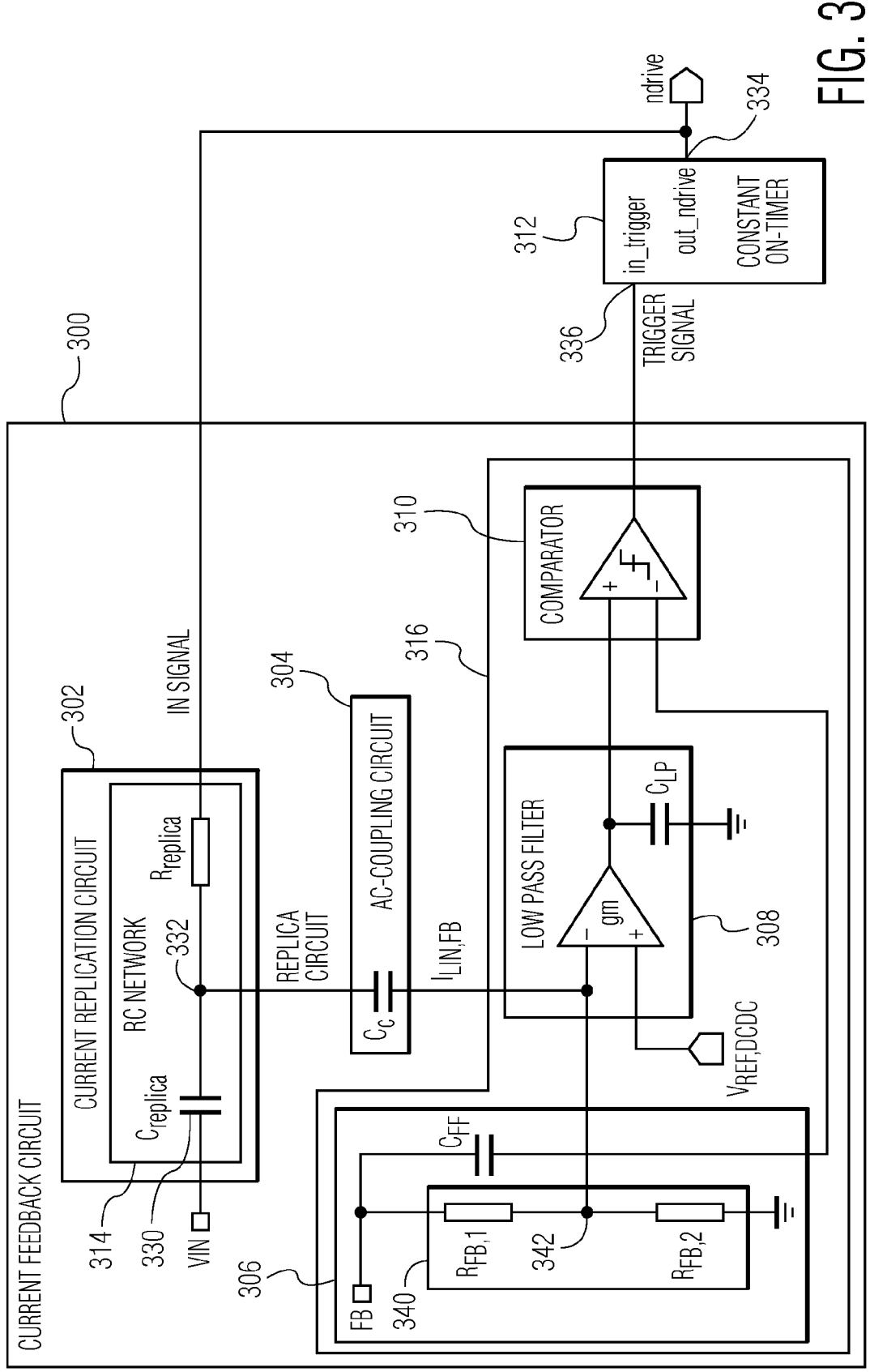
FIG. 3 depicts an embodiment of the current feedback circuit depicted in FIG. 2.

FIG. 3 depicts an embodiment of the current feedback circuit 200 of FIG. 2. In the embodiment depicted in FIG. 3, a current feedback circuit 300 includes a current replication circuit 302, an AC-coupling circuit 304, and a regulation circuit 316, which includes a feedback divider circuit 306, a low-pass filter 308, and a feedback comparator 310. The current feedback circuit is used to provide current feedback for a DC-DC converter. The current feedback circuit 300 depicted in FIG. 3 is one possible embodiment of the current feedback circuit 200 depicted in FIG. 2. However, the current feedback circuit depicted in FIG. 2 is not limited to the embodiment shown in FIG. 3.

The current feedback circuit 300 can generate the replica current feedback using passive components only, avoiding the use of active components. In addition, the current feedback circuit can rely on only internal signals of the corresponding DC-DC converter for current replication and reduce the need for external power sources. Further, the current feedback circuit has no special speed requirements for the low-pass filter 308.

The current replication circuit 302 of the current feedback circuit 300 uses a RC network or RC combination 314 to provide current replication for a DC-DC converter. Specifically, the RC network 314 includes a resistor, "$R_{replica}$," and a capacitor, "$C_{replica}$." The RC network may be dimensioned so that a linear slope builds up a current replica. The current in a coil of the corresponding DC-DC converter is a linear function over time. To build the replica current, the most linear part of the charge slope of the RC network is used such that the voltage slope at the capacitor, "$C_{replica}$," of the RC network is directly proportional to the current slope of the corresponding inductor current. In some embodiments, the resistance, "R," of the resistor, "$R_{replica}$," and the capacitance, "C," of the capacitor, "$C_{replica}$," satisfy:

$$\tau = R*C \geq Tonmax, \quad (1)$$

to keep the linear part of charging characteristics of the capacitor, "$C_{replica}$," where Tonmax represents the maximum on-time of the DC-DC converter. The terminal 330 of the capacitor, "$C_{replica}$," is connected to an input terminal, "Vin." In some embodiments, if the RC network is used for a boost DC-DC converter, the terminal 330 of the capacitor, "$C_{replica}$," is connected to the input voltage of the corresponding boost DC-DC converter. Alternatively, if the RC network is used for a buck DC-DC converter, the terminal 330 of the capacitor, "$C_{replica}$," is connected to the output voltage of the buck DC-DC converter. In the embodiment depicted in FIG. 3, the RC network is driven by an internal signal, "IN," which represents the on-time of the power stage of the corresponding DC-DC converter. Specifically, the resistor, "$R_{replica}$," is connected to the output terminal 334 of a constant-on timer 312 of the corresponding DC-DC converter, which defines the on-time of the power stage of the corresponding DC-DC converter. Compared to driving the current replication circuit using an external signal, using the internal signal, "IN," to drive the current replication circuit can reduce or eliminate the need for a connection to external circuitry with e.g. higher voltages (e.g., as in a DC-DC boost converter), and can reduce or eliminate negative going voltages (e.g., as in a DC-DC Buck converter).

The output voltage of the RC network 314 contains both an AC-component that relates to the replica current of a coil of the corresponding DC-DC converter and a DC-component that can negatively affect the operation of the regulation circuit 316. In the embodiment depicted in FIG. 3, the AC-coupling circuit 304 includes a capacitor, "$C_C$," connected to a node 332 between the resistor, "$R_{replica}$," and the capacitor, "$C_{replica}$." The capacitor, "$C_C$," is used to remove the DC component of the output voltage of the RC network. Removing the DC component of the replica current allows the current replication circuit to generate a replication current without significantly affecting the operation of the regulation circuit 316. In some embodiments, the resistance of the resistor, "$R_{replica}$," and the capacitance of the capacitor, "$C_C$," is set such that feedback current is strong enough to avoid instability.

The feedback divider circuit 306 includes a divider network 340 that includes two resistors, "$R_{FB,1}$," and "$R_{FB,2}$," and a feed forward capacitor, "$C_{FF}$." In the embodiment depicted in FIG. 3, the resistor, "$R_{FB,1}$," and the feed forward capacitor, "$C_{FF}$," are connected to a feedback terminal, "FB," from which a feedback signal with a feedback current (e.g., the output current of the corresponding DC-DC converter) and/or a feedback voltage (e.g., the output voltage of the corresponding DC-DC converter) is received. The processed replication current, "$I_{Lin,FB}$," from the capacitor, "$C_C$," is added to the divided output signal from the feedback divider circuit 306 at a node 342 between the resistors, "$R_{FB,1}$" and "$R_{FB,2}$."

The feedback current from the current replication circuit 302 can cause a DC offset. In the embodiment depicted in FIG. 3, the low-pass filter 308 is used to compensate for the DC-offset caused by the feedback current. The low-pass filter includes an operational transconductance amplifier (OTA), "gm," and a capacitor, "$C_{LP}$." The output voltage of the corresponding DC/DC converter or a scale version of the output voltage of the corresponding DC/DC converter can be used as a reference voltage, "$V_{REF,DCDC}$," to the OTA, "gm." In some embodiments, the output voltage, "$V_{OUT,DCDC}$," of the corresponding DC-DC converter can be expressed as:

$$VOUT.DCDC = (1+R1/R2)*VREF.DCDC, \quad (2)$$

where R1, R2 represent the resistances of the resistors, "$R_{FB,1}$," and "$R_{FB,2}$," respectively.

The low-pass filter 308 is part of the regulation/feedback circuit 316 that is used to stabilize the output DC-component over the output load range. For example, the low-pass filter can correct deviations in the output voltage of the DC/DC converter caused by the current feedback. In addition, the low-pass filter can also provide a DC mean value based on the divided output voltage from the feedback divider, based on the replica current from the AC-coupling circuit 304, and based on the output voltage of the DC/DC converter. The speed of the low-pass filter can be dictated by choosing the 0 dB frequency such that the feedback circuit can work as intended.

The divided output voltage from the feedback divider circuit 306 is combined with the replica current from the AC-coupling circuit 304 and the combination result is fed into the low-pass filter 308 and is used as a reference to the feedback comparator 310. In the embodiment depicted in FIG. 3, the output (e.g., DC mean value) of the low-pass filter serves as an input signal to the feedback comparator, which compares the output of the low-pass filter against the signal resulting from adding the divided output voltage with the current replica signal. Based on the inputs, the feedback comparator generates a trigger signal to control the constant on-timer 312 through an input terminal 336 of the constant on-timer.

Figure 4:
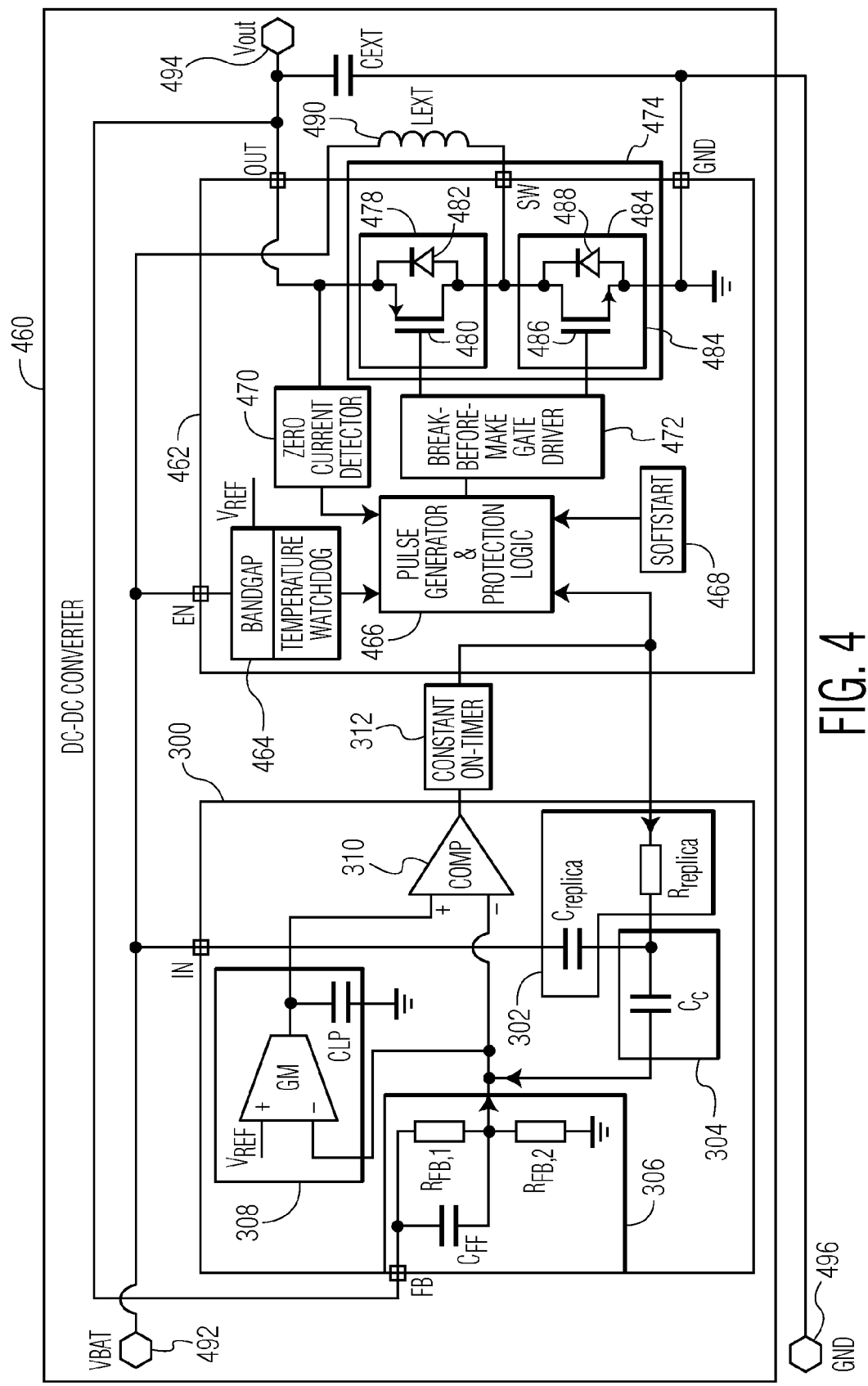
FIG. 4 depicts an embodiment of a DC-DC converter in which the current feedback circuit of FIG. 3 can be used.

FIG. 4 depicts an embodiment of a boost DC-DC converter 460 in which the current feedback circuit 300 of FIG. 3 can be used. In the embodiment depicted in FIG. 4, the boost DC-DC converter includes the current feedback circuit 300, a constant on timer 312, a power stage circuit 642, and a coil/winding 490. The power stage circuit includes a bandgap and temperature watchdog circuit 464, pulse generation and protection logic 466 with a soft-start circuit 468, a zero current detector 470, a break-before-make gate driver circuit 472, and a gate circuit 474. The gate circuit includes a first transistor/diode combination 478, which includes a transistor 480 and a diode 482, and a second transistor/diode combination 484, which includes a transistor 486 and a diode 488. The DC-DC converter has an input terminal 492 from which an input voltage, "$V_{BAT}$," is received, and an output terminal 494 from which an output signal, "$V_{OUT}$," is output. The output terminal of the DC-DC converter is connected to an external capacitor, "$C_{EXT}$." The DC-DC converter is connected to a terminal 496, which is connected to ground (GND). DC-DC converter depicted in FIG. 4 is one possible embodiment of DC-DC converter in which the current feedback circuit of FIG. 3 can be used. However, DC-DC converters in which the current feedback circuit of FIG. 3 can be used are not limited to the embodiment shown in FIG. 4.

The constant-on timer 312 provides an active and inactive cycle depending on the input voltage, started by the comparator (310), such that a defined on and off time is generated.

The bandgap and temperature watchdog circuit 464 can use a bipolar transistor and a voltage multiplier (e.g., a vt-current fed to a vbe of the bipolar transistor and the voltage multiplier), to generate a bandgap reference, which delivers an approximately constant voltage over a certain temperature range. The bandgap and temperature watchdog circuit can also use a bipolar diode, powered by a constant current, to provide a voltage depending on temperature. The known vbe of the bipolar transistor as well as the known temperature coefficient of the bipolar transistor can provide a defined temperature. A voltage, divided part of the gap-reference (nearly temperature independent, and the voltage of the bipolar diode (negative temperature coefficient) can provide a threshold to reduce the active phase of the converter 460 and/or to switch-off the power stage 462. In some embodiments, the bandgap and temperature watchdog circuit uses a comparator connected to the bandgap and the voltage across the bipolar diode, powered by a constant current.

In the startup phase, the active pulse can be limited in its duration such that the current through the coil 490 is limited (inrush current). The softstart circuit 468 allows a pulse on-time to increase from nearly 0 to its maximum value with a fixed off time.

The zero current detector 470 can serve as a first protection circuit, which provides a signal if the coil current is nearly zero and the conduction transistor is switched off to avoid reverse current in the transistor 480. In addition, the zero current detectors can detect a broken feedback such as a broken connection from VOUT to the internal feedback circuit, using a comparator to measure the voltage difference between the signal VOUT and the signal at feedback terminal, "FB."

The break-before-make circuit 472 can define a delta in timing to avoid conduction through NMOS and PMOS power stage in the way that the single transistor must be switched off before the other one can be switches on.

Figure 5:
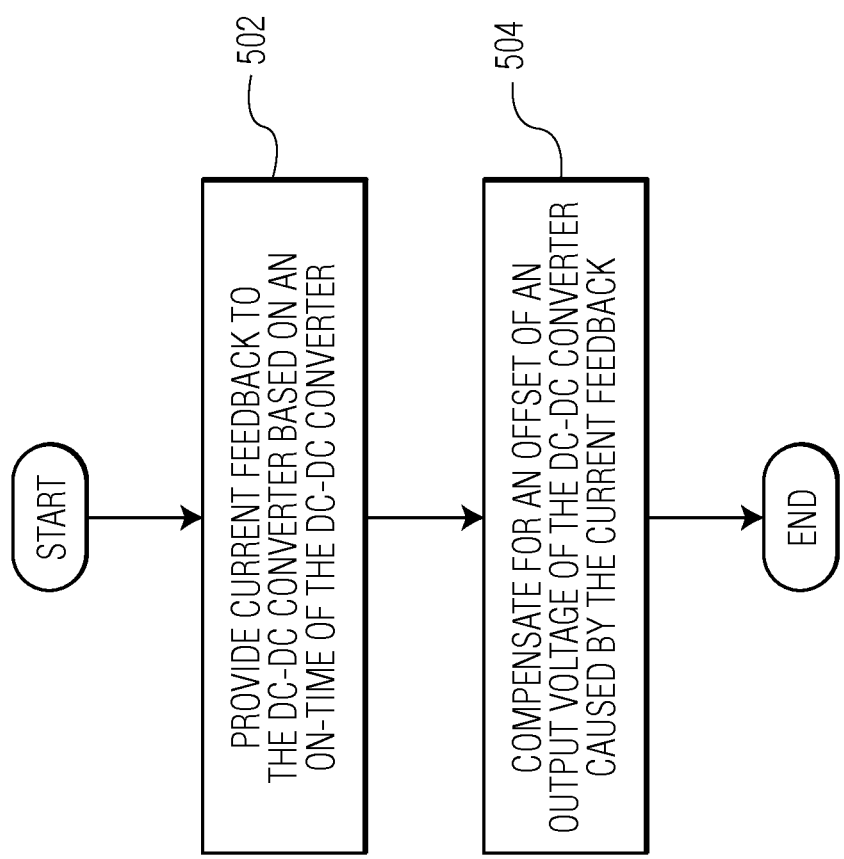
FIG. 5 is a process flow diagram of a method for operating a current feedback circuit for a DC-DC converter in accordance with an embodiment of the invention.

FIG. 5 is a process flow diagram of a method for operating a current feedback circuit for a DC-DC converter in accordance with an embodiment of the invention. The current feedback circuit may be similar to or the same as the current feedback circuit 100 depicted in FIG. 1, the current feedback circuit 200 depicted in FIG. 2, the current feedback circuit 300 depicted in FIG. 3, and/or the current feedback circuit 400 depicted in FIG. 4. The DC-DC converter may be similar to or the same as the DC-DC converter 430 depicted in FIG. 4. At block 502, current feedback is provided for the DC-DC converter based on an on-time of the DC-DC converter. At block 504, an offset of an output voltage of the DC-DC converter caused by the current feedback is compensated for.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A current feedback circuit for a Direct Current (DC)-DC converter, the current feedback circuit comprising:
    a voltage divider circuit having an input coupled to an output of the DC-DC converter, and an output;
    a feedback comparator having a first input, a second input coupled to the output of the voltage divider circuit, and an output;
    a filter circuit having a first input for receiving a reference voltage, a second input coupled to the output of the voltage divider circuit, and an output coupled to the first input of the feedback comparator;
    a current replication circuit comprising:
        a resistor having a first terminal coupled to the output of the feedback comparator, and a second terminal; and
        a first capacitor having a first terminal coupled to the second terminal of the resistor, and a second terminal coupled to a power source,
        wherein the current replication circuit is configured to provide current feedback to the DC-DC converter based on an on-time of the DC-DC converter; and
    an alternating current (AC)-coupling circuit comprising a second capacitor having a first terminal coupled to the first terminal for the first capacitor, and a second terminal coupled to the output of the voltage divider circuit, the AC coupling circuit configured to add the current feedback to a regulation circuit of the current feedback circuit and to remove a DC voltage from the current replication circuit,
    wherein the regulation circuit comprises the filter circuit, the filter circuit configured to compensate for an offset of an output voltage of the DC-DC converter caused by the current feedback.

2. The current feedback circuit of claim 1, wherein the resistor and the first capacitor are formed using passive components.

3. The current feedback circuit of claim 1, wherein the power source is a battery.

4. The current feedback circuit of claim 1, wherein the current replication circuit is configured to generate a current based on the reference voltage and the on-time of the DC-DC converter.

5. The current feedback circuit of claim 4, wherein the reference voltage is an input voltage of the DC-DC converter if the DC-DC converter is a boost DC-DC converter.

6. The current feedback circuit of claim 4, wherein the reference voltage is the output voltage of the DC-DC converter if the DC-DC converter is a buck DC-DC converter.

7. The current feedback circuit of claim 1, wherein the filter circuit comprises a transconductance amplifier.

8. The current feedback circuit of claim 1, wherein second capacitor is formed using a passive component.

9. The current feedback circuit of claim 1, wherein the filter circuit comprises a low-pass filter.

10. The current feedback circuit of claim 1, wherein the voltage divider circuit comprises a second resistor, a third resistor, and a third capacitor, the second resistor having a first terminal connected to the output of the DC-DC converter, and a second terminal coupled to the output of the voltage divider circuit, the third resistor having a first terminal coupled to the second terminal of the second resistor, and a second terminal coupled to a ground terminal, the third capacitor having a first terminal coupled to the first terminal of the second resistor, and a second terminal coupled to the second terminal of the second resistor.

11. The current feedback circuit of claim 10, wherein the output of the feedback comparator is coupled to an input of a constant on-timer, an output of the constant on-timer coupled to the second terminal of the resistor of the current replication circuit.

12. The current feedback circuit of claim 11, wherein the output of the constant on-timer is coupled to an input of a power stage of the DC-DC converter.

13. The current feedback circuit of claim 1, wherein the feedback signal is the output voltage of the DC-DC converter.

14. The current feedback circuit of claim 1, wherein the current replication circuit is configured to generate a current based on a reference voltage and the on-time of the DC-DC converter, wherein the filter circuit comprises a low-pass filter connected to the AC-coupling circuit and to the feedback divider circuit and configured to filter a signal that is a combination of the current and the divided feedback signal to generate a filtered signal.

15. The DC-DC converter comprising the current feedback circuit of claim 1, wherein the DC-DC converter is a Buck DC-DC converter, a Boost DC-DC converter, or a Buck-Boost DC-DC converter.

16. The DC-DC converter of claim 1, wherein the DC-DC converter further comprises a timer circuit configured to generate the on-time of the DC-DC converter.

17. A current feedback circuit for a Direct Current (DC)-DC converter, the current feedback circuit comprising:
a Resistor-Capacitor (RC) network configured to generate a current based on a reference voltage and an on-time of the DC-DC converter, wherein the RC network consists of a first resistor and a first capacitor, wherein the first resistor having a first terminal coupled to an output of a feedback comparator, and a second terminal, and wherein the first capacitor having a first terminal coupled to the second terminal of the first resistor, and a second terminal coupled to a power source; and
a second capacitor having a first terminal coupled to the second terminal of the first resistor, and a second terminal, the second capacitor configured to add current feedback to a regulation circuit of the current feedback circuit and to remove a DC voltage from the RC network,
wherein the regulation circuit comprises:
a feedback divider circuit connected to the second terminal of the second capacitor and configured to generate a divided feedback signal based on an output voltage of the DC-DC converter;
a low-pass filter having a first input for receiving the reference voltage, a second input coupled to an output of the feedback divider circuit, and an output coupled to a first input of the feedback comparator and configured to compensate for an offset of the output voltage of the DC-DC converter caused by the current by filtering a signal that is a combination of the current and the divided feedback signal to generate a filtered signal; and
the feedback comparator configured to compare the signal with the filtered signal.

18. The current feedback circuit of claim 17, wherein the feedback divider circuit consists of a second resistor, a third resistor, and a third capacitor, wherein the second and third capacitors are connected to a node between the second resistor and the third resistor.

19. The current feedback circuit of claim 17, wherein the reference voltage is an input voltage of the DC-DC converter if the DC-DC converter is a booster DC-DC converter and, wherein the reference voltage is the output voltage of the DC-DC converter if the DC-DC converter is a buck DC-DC converter.

* * * * *